STATION SELECTOR SIGNALING SYSTEM

Filed Feb. 13, 1947 2 Sheets-Sheet 1

INVENTOR
CARL A. LEVIN
BY Emery Robinson
ATTORNEY

March 21, 1950 C. A. LEVIN 2,501,063

STATION SELECTOR SIGNALING SYSTEM

Filed Feb. 13, 1947 2 Sheets-Sheet 2

INVENTOR
CARL A. LEVIN
BY Emery Robinson
ATTORNEY

Patented Mar. 21, 1950 2,501,063

UNITED STATES PATENT OFFICE 2,501,063

STATION SELECTOR SIGNALING SYSTEM

Carl A. Levin, Chicago, Ill., assignor to Teletype Corporation, Chicago, Ill., a corporation of Delaware Application February 13, 1947, Serial No. 728,243

2 Claims. (Cl. 178—2)

Figure 1:
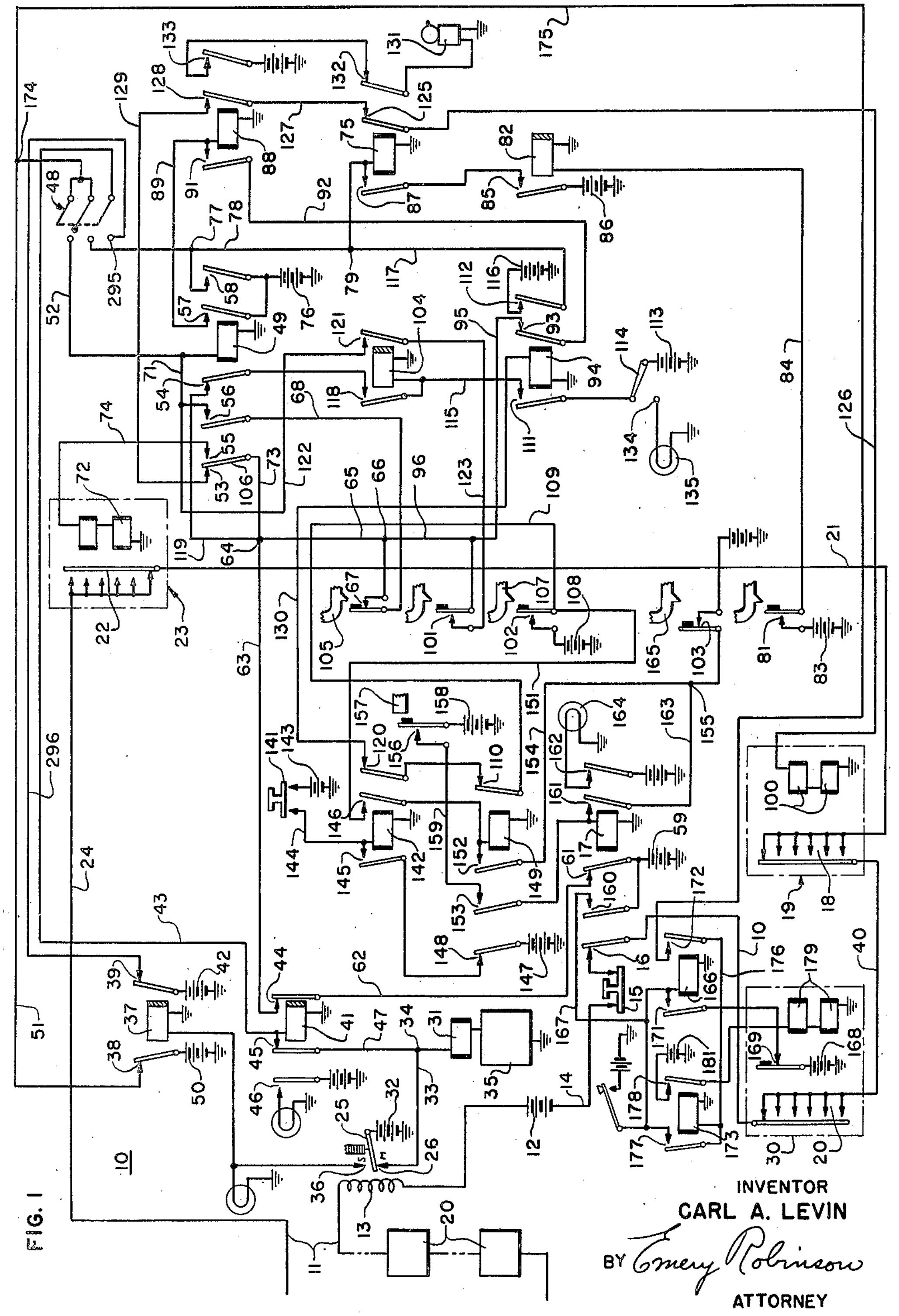

This invention pertains to printing telegraph systems and more particularly to transmission control systems.

The principal object of the invention is to provide in a sequential selective control system a means whereby any station in the loop circuit may at any time initiate a "line break" which will enable it to transmit after the message is completed from the interrupted station.

Another object of the invention is to provide a deferred break in the line circuit, so that when a remote station is transmitting over the line and any other station on the loop circuit desires to interrupt or "break in," provision is made for deferring the effect of the "break" until the message being transmitted is completed.

Specifically, the present invention is utilized in a system of automatic selective transmission control for use in connection with preliminary collection of weather or other information over a telegraph communication system. Control of such system is provided by primary sequential control equipment of the type disclosed in copending application, Serial No. 599,323, filed June 14, 1945, by G. G. Keyes, which application is incorporated herein by reference. The system according to said copending application utilizes selector equipment at each station, which is always connected to the line and surveys all traffic passing over the line.

In the embodiment wherein the "deferred break" feature according to the invention is employed, a sequence collection on this system starts with the transmission from the primary or central station of a predetermined sequence of characters which includes a two or more letter station identification of the first way station from which transmission is desired. At this point transmission from the primary or central station equipment ceases and the secondary or way station equipment, recognizing the identification letters of its station, starts transmission of the message (for example, weather information) waiting in the form of previously prepared perforated tape. At the conclusion of this message, end-of-message signals in the message tape are transmitted to shut down transmission from the way station and activate the primary or central station equipment to transmit the station identification letters of the next desired way station to be called in. The sequence of transmission of station identification letters at the primary station is contained in a continuous loop of perforated tape. The loop of tape need be changed only when a rearrangement of the order in which station transmission occurs is desired. This calling in of a plurality of way stations by a central station in a predetermined sequential order is known as a transmitting program.

In this embodiment also, it is contemplated that weather information shall be collected hourly at which times transmission of such information, which has been previously prepared on perforated tapes, from each station will occur automatically under the control of the master control station in predetermined order in response to the operation of a switch at the master control station. Pursuant to the operation of said switch the entire sequence collection will take place automatically.

During the sequential collection of weather or other data, as alluded to above, it may become necessary to interrupt said collection to insert or interpose an urgent message from the primary control station or from a secondary or way station. Thus, with the "deferred break" device according to the present invention, such interruption can occur only after the completion of the message from the station then transmitting. When it is desired to insert an urgent message during the sequential collection of weather or other data, a perforated tape containing the urgent message is placed in a message transmitter in well known manner, and a line break key, identified herein as the "deferred break" key, is operated. Instead of opening or breaking the signal line immediately, the present invention contemplates an arrangement for deferring the effect of the operation of the deferred break key until the way station then transmitting has completed its message. Each message is terminated with a group of signals called the end-of-message code signals, which are instrumental in initiating transmission of the urgent message in the following manner. The arrangement for deferring the transmission of the urgent message comprises, in addition to the "break" key, a plurality of relays connected in cascade, the last relay of which dually controls the opening and closing of the signal line and the conditioning of the message transmitter for operation. The cascade relays are further controlled by a series of selectively controlled contacts in response to said end-of-message code signals. During the transmission of said urgent message the transmitting program is temporarily suspended, and is again resumed in response to the end-of-message code signals terminating said urgent message.

Figure 2:
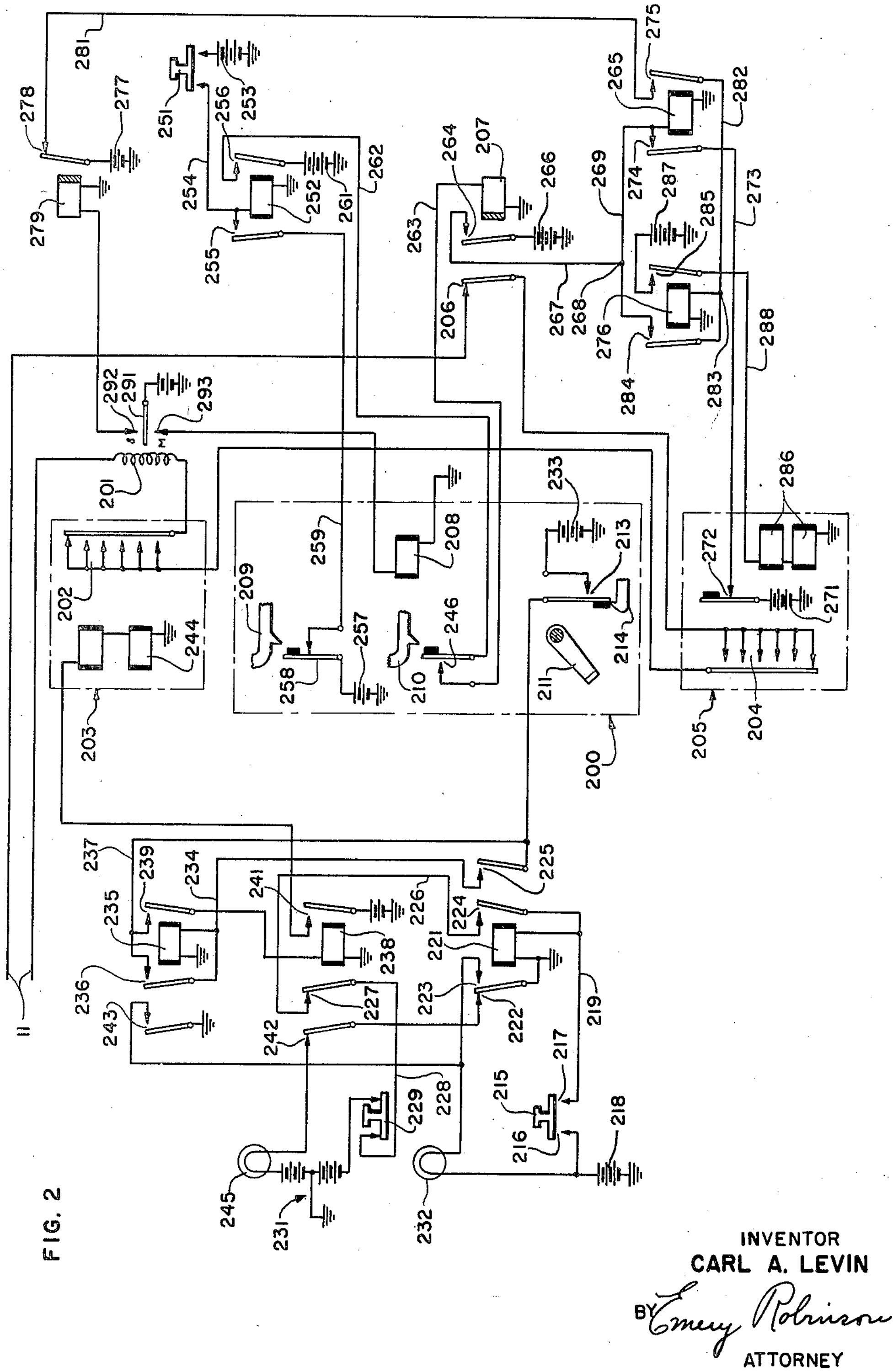

A better understanding of the invention may be had from the following description taken in conjunction with the accompanying drawings wherein:

Fig. 1 is a schematic diagram of the electrical circuit at the central or master control station; and Fig. 2 is an electrical circuit diagram for the way station.

Having reference to the drawing, the signal line 11, including central station 10 and a plurality of way stations 20, is indicated as deriving its signal current from battery 12. At the central station the line circuit extends from one side of line, through line relay 13, over conductor 14, through line break key 15 (now closed), through contact 16 (now closed) of a line break relay 17, over conductor 10, through transmitting contacts 29 of message transmitting unit 30, over conductor 40, through transmitting contacts 18 of auxiliary tape transmitter 19, over conductor 21, through transmitting contacts 22 of tape transmitter 23, then over conductor 24 to the other side of the line 11. With marking current on the line 11, the armature 25 of line relay 13 will be held against its marking contact 26 thus completing a circuit for selector magnet 31 of the sequential control unit such as is disclosed in copending application Serial No. 599,323 filed June 14, 1945, by G. G. Keyes, said circuit extending from grounded battery 32, through contact 26 of line relay 13, over conductor 33 to junction 34, then through the winding of magnet 31 and through a receiving printer 35 of any well known design, to ground.

Since the spacing contact 36 of relay 13 is open at this time, the circuit for slow-to-release relay 37 will be broken and relay 37 will be de-energized. In this condition of relay 37, the armatures thereof will be released to close contacts 38 and 39. With contact 39 thus closed, an energizing circuit is prepared for a slow-to-release relay 41 from battery 42, through contact 39, over conductor 296, through contact 295 of switch 48 (when momentarily closed, as will presently appear) over conductor 43 and through the winding of relay 41 to ground. In this condition of relay 41, the armatures thereof will be attracted to close contacts 44 and 45 and open contact 46. The locking circuit for relay 41 is established from battery 32, over armature 25, through contact 26, over conductors 33 and 47, through contact 45, and through the winding of relay 41 to ground.

Preparatory to sequential message collection a continuous loop of tape is prepared having perforated therein, in addition to the "sequence collection heading" group of code signals mentioned previously, groups of code signals, each group pertaining to a particular way station, and said groups arranged in the order in which it is desired to call in the way stations. The loop of tape need be changed only when a rearrangement of the order in which station transmission occurs is desired. Each group of code signals pertaining to a particular way station comprises conditioning codes followed by the station identification letters of the way station from which transmission is desired followed by further conditioning codes. For example, in the system according to the present invention, such a group of code signals would comprise the following codes: Carriage return, Carriage return, or "Figures," "Letters," A, B, C (or other station identification characters), Space and "Letters."

The loop of tape just mentioned is properly inserted in the tape transmitter 23 with the sequence collection heading group of code signals properly adjusted with respect to the transmitting contacts 22. During normal signaling operation the relay 37 will become energized and remain so despite the constant opening and closing of contact 36 because relay 37 is of the slow-to-release type. Similarly, relay 41, being of the slow-to-release type also remains energized despite the opening and closing of contact 26.

Now, with the line 11 normally marking, the relay 37, after a predetermined period is de-energized so that the contacts 38 and 39 are closed, and the switch 48 is closed momentarily. The previously traced circuit for energizing relay 41 is now completed upon the closing of contact 295, and relay 41 is locked over the circuit extending from battery 32, over armature 25, through contact 26, over conductors 33 and 47, through contact 45 and through the winding of relay 41. An energizing circuit for relay 49 is thereupon established from battery 50, through contact 38 (now closed) of relay 37, over conductor 51, through switch 48, then over conductor 52 and through the winding of relay 49 to ground. Relay 49 energizes and opens its contacts 53 and 54, and closes its contacts 55, 56, 57, and 58. A locking circuit for relay 49 is thus established from battery 59, through contact 61 of relay 17, over conductor 62, through contact 44 (now closed) of relay 41, over conductor 63 to junction 64, over conductor 65 to junction 66, through contact 67 (now closed) in the sequential control unit, over conductor 68, through contact 56 (now closed) of relay 49, over conductor 71 and through the winding of relay 49 to ground.

Upon the closing of contact 55 of relay 49, a circuit is established for energizing the start magnet 72 of the transmitter 23, extending from battery 59, through contact 61, over conductor 62, through contact 44 (now closed) of relay 41, over conductor 63 to junction 64, over conductor 73, through contact 55 (now closed) of relay 49, over conductor 74 and through the windings of start magnet 72 to ground. By the energization of clutch magnet 72 the sequential control tape transmitter 23 is initiated into operation to effect transmission to the signal line 11 of the message matter perforated in the previously mentioned loop of tape which contains a perforated record of the sequence in which the stations in the loop circuit are permitted to transmit their particular messages, such as weather data, over the signal line 11. However, before station identification signals are transmitted from the unit 23 to bring in the way stations, general data pertaining to circuit, date, time, etc. (contained in the loop of tape) is transmitted from the master control station. Following the transmission of the general data (such as the "sequence collection heading" group of codes) the conditioning and station identification codes are transmitted.

The energization of relay 49 effects the energization of relay 75 over a circuit extending from battery 76, through contact 58 (now closed) to junction 77, then over conductor 78 to junction 79 and then through the winding of relay 75 to ground. Since the universal contact 81 in the sequential control unit is closed upon the reception of all signals received by the selector magnet 31, an energizing circuit for slow-to-release relay 82 is established from battery 83, through contact 81 (when closed cyclically), over conductor 84 and through the winding of relay 82 to ground. The energization of relay 82 causes the closure of its contact 85 to complete a locking circuit for relay 75 extending from battery 86, through contact 85 (now closed) of relay 82, through contact 87 (now closed) of relay 75 and through the winding of said relay 75 to ground.

The energization of relay 49 also closes its contact 57 to establish a circuit for relay 88 from battery 76, through contact 57, over conductor 89, through the winding of relay 88 to ground. Relay 88 becomes locked up over a circuit extending from ground, through the winding of relay 88, through contact 91 (now closed) of relay 88, over conductor 92, through contact 93 (now closed) of relay 94, over conductors 95, 96, 65, and 63, through contact 44 (still closed) of relay 41, over conductor 62, through contact 61 of relay 17 to battery 59.

With the transmitter 23 now operating, transmission takes place under the control of the previously prepared tape inserted therein. Under this condition of operation, relays 49, 75, 82, and 88 are energized, which have become such upon the momentary closure of switch 48.

As mentioned hereinbefore, the first code combination transmitted in the conditioning code (following the "sequence collection heading" group of codes) is the Carriage return code signal. As the Carriage return signal is transmitted over the line 11 it actuates the line relay 13 in accordance with the marking and spacing impulses of the signal, in well known manner, to vibrate the armature 25 accordingly. As the armature 25 vibrates, the selector magnet 31 of the master control unit, disclosed in the aforementioned copending application, responds and controls the selection of a series of bars to effect the closing of contacts 67, 81, 101, 102, and 103. Contact 67, as described previously is opened in response to a "Space" signal. Contact 101 is closed in response to a "Letters" signal. Contact 102 closes in response to an Upper case carriage return signal. Contact 103 closes in response to a "Blank" signal. Contact 81, as previously described, is a universal contact and closes in response to all signals. The effect of the opening and/or closing of contacts 67, 81, 101, 102, and 103 will appear hereinafter.

As previously indicated, the second code combination of the conditioning code is a Carriage return code signal or "Figures" code signal. However, according to the present embodiment, only the receipt of a Carriage return signal preceded by a "Figures" or "Upper case" signal affects the circuit. Next, the "Letters" code signal is received, but owing to the fact that the relay 104 has not yet become operated, the reception of the "Letters" signal has no effect. The next signal codes to be transmitted by the transmitting unit 23 are the station identification code signals, which may consist of any number, preferably three. These code signals have no further effect on the master control or the circuit shown, but they together with the conditioning code signals just referred to (C. R., C. R., or "Figs.," "Letters") effect the operation of the ratchet assembly (described in the copending application) of the way station apparatus to close a contact to initiate the message transmitter at the way station into operation to transmit the weather report therefrom.

Following the transmission of the station identification code signals, a "Space" signal is impressed on the signal line 11, the effect of which is to operate the bar 105 to open contact 67 (which is normally closed) to break the previously traced locking circuit for relay 49, which in turn by releasing its armature 106 opens its contact 55 to break the energizing circuit for the clutch magnet 72 of transmitter 23, thereby stopping transmission. The transmitter 23 remains in the stop position or condition pending the control or seizure of the signal line 11 by the control unit located at the selected way station, as described in the copending application.

At the conclusion of message transmission at the way station, an end-of-message signal is transmitted, comprising the following code signal combinations: "Figures," "Carriage return" and "Letters." These code signals are perforated in the tape following the regular message, and are impressed on the line to perform a dual function. First, as described in the copending application, these signals pass through the selector magnet of the control unit at the way station to operate a selectable bar to restore the way station circuit and apparatus to normal as will appear hereinafter.

Secondly, the end-of-message code signals will affect the circuit at the master control station in the following manner. It will be recalled that relays 37, 41, 75, 82, and 88 are still energized. Upon receipt of the "Figures" code signal, the master control unit will be conditioned to permit the operation of a bar 107 upon receipt of the next code signal which is a Carriage return signal, it being remembered that contact 102 is closed in response to an Upper case carriage return signal. When, therefore, contact 102 is closed in response to the receipt in succession of a "Figures" code signal and a Carriage return code signal, a circuit is completed for the energization of relay 94 extending from battery 108, through contact 102 (now closed momentarily) over conductor 109 through contact 110 (now closed) of relay 149, through contact 120 (now closed) of relay 142, over conductor 139, and through the winding of relay 94 to ground.

Relay 94 upon operating closes its contacts 111, and 112 and opens its contact 93. The opening of contact 93 breaks the energizing circuit for relay 88. The closing of contact 111 establishes a circuit for relay 104 extending from battery 113, over switch arm 114, through contact 111, over conductor 115 and through the winding of relay 104 to ground. The closing of contact 112 establishes a circuit for relay 75 from battery 116, through contact 112 (closed momentarily), over conductor 117 to junction 79, then through the winding of relay 75 to ground. Relay 75 upon operating becomes locked up over a circuit extending from battery 86, through contact 85 (now closed) of slow-to-release relay 82 (which is maintained operated so long as universal contact 81 is operated in response to each received code signal).

Since contact 111 is also closed momentarily to operate relay 104, said relay 104 becomes locked up through its contact 118 over a circuit extending from ground, through the winding of relay 104, then through contact 118 (now closed), through contact 54 (now closed, since relay 49 is now de-energized), then over conductors 119 and 63, through contact 44 (still closed), over conductor 62, through contact 61 to battery 59. The energization of relay 104 also effects the closing of its contact 121 to prepare an energizing circuit for the re-energization of relay 49 when the contact 101 is closed in response to the next code signal, which is the "Letters" signal.

Therefore, when said "Letters" signal is received, the energizing circuit for relay 49 is established from ground, through the winding of relay 49, over conductors 71 and 122, through contact 121 (now closed) of relay 104, over conductor 123, through contact 101 (closed momentarily), over conductors 96, 65, and 63, through contact 44, over conductor 62, through contact 61 to battery 59. Relay 49 becomes locked up over a circuit extending from ground, through the winding of relay 49, over conductor 71, through contact 56 (now closed), over conductor 68, through contact 67 (normally closed), over conductors 65 and 63, through contact 44, over conductor 62, through contact 61 to battery 59.

Relay 49 upon becoming thus energized, again closes its contact 55 to complete the energizing circuit for the start magnet 72 of transmitting unit 23 extending from battery 59, through contact 61, over conductor 62, through contact 44 (still closed), over conductors 63 and 73, over armature 106, through contact 55, over conductor 74, and through the windings of magnet 72 to ground. Thus, in response to the end-of-message code signal group the central or master control station is activated to thereby transmit the conditioning and station identification code signal combinations to the next desired way station to be called in or selected. It will also be recalled that the order or sequence in which the way stations are called in is contained in a continuous loop of perforated tape. As the transmitter 23 is thus operated, the relays illustrated in the circuit diagram are again actuated in the order and manner previously described.

In the event that the selected or called way station fails to respond to the call of the master control station, or in case the way station just terminating its message transmission fails to send an end-of-message group of signals, provision is made for both these eventualities by providing in the circuit arrangement additional relays 75, 82, and 88 and an auxiliary tape transmitter 19. A prerequisite to the activation of the master control station circuit in both of these eventualities is the presence of a predetermined time delay wherein the signal line 11 remains in a marking condition so that slow-to-release relay 82 will be given time to de-energize, or the way station be given time to respond.

Therefore, if a way station fails to respond, then the end-of-message group of signals is not received by the master control station, and hence the Upper case carriage return bar 107 is not operated, and accordingly the contact 102 is not operated and the relay 94 is not energized. Since the failure of relay 94 to operate is indicative of the failure of a way station to respond, the contact 93 thereof, which is in the locking circuit of relay 88, remains closed and the relay 88 remains operated. Then, when relay 82 de-energizes after a predetermined period, its contact 85 opens to break the locking circuit for relay 75, thereby causing contact 125 thereof to close, thus completing an energizing circuit for start magnet 100 of auxiliary transmitter 19 extending from ground, through the windings of magnet 100, over conductor 126, through contact 125 (now closed) of relay 75, over conductor 127, through contact 128 (still closed) of relay 88, over conductor 129, through contact 53, (now closed) of relay 49, over conductors 73 and 63, through contact 44, over conductor 62, through contact 61 to battery 59.

In the auxiliary transmitter 19 is a loop of tape having preforated therein a series of groups of signals comprising the end-of-message group of signals, and the circuit arrangement shown is such that this group of signals will be automatically inserted by the master control station when said signal group is not received from a way station. When this eventuality occurs, an alarm bell 131 rings, being operated over an obvious circuit including contact 132 (now closed) of relay 75 and contact 133 (still closed) of relay 88. When the circuit is operating automatically the switch arm 114 is positioned as shown, but when manual operation is desired the arm 114 is swung over to contact 134, thereby lighting a lamp 135.

Impressing the missing end-of-message group of signals upon the signal line 11 causes the selector magnet 31 to respond to effect the selection of bar 107 to operate contact 102 when the upper case carriage return signal is received. The closure of contact 102 effects the energization of relay 94 which locks up as previously described. The ensuing series of operations is the same as afore-mentioned until the start magnet 72 of the sequence control transmitter 23 is operated, whereupon normal operation of the system is restored until another missing end-of-message signal occurs.

In accordance with a feature of the invention it is possible for the master control station to introduce or anticipate a "break" in the sequential transmission without interrupting the message then being impressed on the line by a way station. This feature is termed the "deferred break" feature and is exemplified by a "deferred action" means which is initiated into operation by the actuation of a "deferred break" key 141 to complete a circuit for energizing a relay 142 (of a plurality of relays connected in cascade) over a circuit extending from battery 143, through the now momentarily closed contacts of key 141, over conductor 144 and through the winding of relay 142 to ground. Relay 142 upon operating closes its contacts 145 and 146, and opens contact 120. The closing of contact 145 provides a locking circuit for relay 142 from battery 147, through contact 148 (now closed) of relay 149, through contact 145 (now closed) and through the winding of relay 142 to ground. The closing of contact 146 prepares an energizing circuit for relay 149 which will be established, as will presently appear. The opening of contact 120 will prevent the end-of-message group of signals from effecting the energization of relay 94 to reinitiate the operation of sequential control transmitter 23.

Thus, the "deferred break" device is conditioned for operation, and nothing further occurs until the message then being impressed on the signal line 11 by a way station is completed and the end-of-message group of signals, namely, "Figures," "Carriage return," "Letters" codes are transmitted therefrom. The use of the "deferred break" contemplates the interruption of automatic sequential control of way stations in order to insert and automatically transmit an urgent message, and thereby disable automatic operation of sequential control transmitter 23. The receipt, therefore, of the Upper case carriage return signal, which effects the closure of contact 102, has no effect upon the transmitter 23, as previously described, because contact 120 is now open. Instead, the closure of contact 102 establishes a circuit for the energization of relay 149 extending from battery 108, through contact 102, over conductor 151, through contact 146 (now closed) of relay 142, and through the winding of relay 149 to ground. Relay 149, upon operating, closes its contacts 152 and 153, and opens its contacts 148 and 110. Also, relay 149 locks up over a circuit extending from ground, through the winding of relay 149, through contact 152 (now closed) of relay 149, over conductor 154 to junction 155, then through contact 103 to positive battery. The opening of contact 148 breaks the locking circuit for relay 142, and hence relay 149 is no longer affected by contact 146. The function of contact 120 (which is again closed) to prevent reinitiation of operation of unit 23 is transferred to the now open contact 110 of relay 149.

Relay 17 is now conditioned for operation through closed contact 153 and open contact 156. Contact 156 is associated with the No. 5 code impulse bar or element in the selecting mechanism, and when operated, completes the energizing circuit for relay 17. Since the last code signal of the end-of-message group of code signals is the "Letters" code, which is an all marking signal, the receipt of the fifth impulse thereof will cause the fifth code impulse bar 157 to be actuated to close contact 156 momentarily, thus completing an energizing circuit for relay 17 extending from battery 158, through contact 156 (closed momentarily), over conductor 159, through contact 153 (now closed) of relay 149, then through the winding of relay 17 to ground. Relay 17 upon energizing opens its contacts 16 and 61 and closes its contacts 160, 161, and 162. The closure of contact 161 establishes a locking circuit for relay 17 from battery, through normally closed contact 103, over conductor 163, through contact 161, and then through the winding of relay 17 to ground. The closing of contact 162 provides an obvious circuit for lamp 164. Simultaneously with the opening of the signal line 11, the contact 160 of relay 17 closes to establish an energizing circuit for relay 166 extending from battery 59 through contact 161 (now closed), over conductor 167 and through the winding of relay 166 to ground.

The breaking or opening of the signal line 11 is effected upon the opening of contact 16 by relay 17. Upon the opening of the signal line 11 a no current condition is created, and hence blank signals will be received by the selector magnet 31. Accordingly, the "blank" selector bar 165 will be operated to open the contact 103 thereby de-energizing relay 17, to in turn close contact 16 to restore the line 11 to marking condition.

In the meantime, however, relay 166 becomes locked up over a circuit extending from battery 168, through "tape-out" contact 169 (normally closed) in the message transmitter 30, then through contact 171 (now closed) of relay 166, over a section of conductor 167 and then through the winding of relay 166 to ground. The "tape-out" contact 169 is controlled by a tape-out pin as disclosed in U. S. Patent No. 2,296,845 issued to M. T. Goetz on September 29, 1942, and is analogous to contact 88 of said patent. Relay 166 also closes its contact 172 to complete an energizing circuit for relay 173 from battery 50, through contact 38 (now closed because of the open line condition and consequent de-energization of relay 37), over conductor 51 to junction 174, then over conductor 175, through contact 172, over conductor 176 and then through the winding of relay 173 to ground. Relay 173 closes its contacts 177 and 178. The closure of contact 177 completes a locking circuit for relay 173 which extends from battery 168, through tape-out contact 169, through contact 171 (still closed) of relay 166, over a section of conductor 167, through contact 177 (now closed) of relay 173, over a section of conductor 176 and through the winding of relay 173 to ground. Contact 178, upon closing, completes an energizing circuit for start magnet 179 of the message transmitter 30 from battery 181, through contact 178, then through the winding of start magnet 179 to ground.

Since the signal line is again closed due to the closure of contact 16, the message contained in the tape inserted in the message transmitter 30 will be transmitted, and transmission will continue until the end-of-message group of signals (punched in the message tape) has been transmitted and the end of the tape is immediately sensed by the tape-out pin, whereupon the contact 169 will open, thereby opening the locking circuits for relays 166 and 173. The transmission of the end-of-message group of code signals functions as previously described to operate bar 107 to close contact 102, the effect of which is to energize relay 94, because contacts 110 and 120 are now closed. Energization of relay 94 controls the re-initiation of operation of the sequential control transmitter 23 to resume the station calling function.

Having reference to Fig. 2, the signal line 11 extends In through a line relay 201, then through transmitting contacts 202 of a data transmitter 203, then through transmitting contacts 204 of a second or urgent message transmitter 205, then through contact 206 (now closed) of relay 207, and then Out over line 11. As previously described, the conditioning code signals; namely, Carriage return, Carriage return, "Letters," A, B, C (station identification) "Space" affect the selector magnet 208 to select the bars 209 and 210 (as disclosed in said copending application Serial No. 599,323), and corresponding other bars. to step the ratchet assembly to the position where arm 211 closes the contact 213 (normally open).

Prior to the reception of the conditioning code signals just described, the contact key 215 is depressed at the hour when it has been predetermined that weather information collection shall proceed. It was further described hereinbefore, that at each way station, a tape has been previously prepared containing the weather or other information, which tape has been inserted in the transmitter 203, and shortly before the appointed time when sequential collection is to begin, the key 215 is operated to close contacts 216 and 217 to establish a circuit from battery 218, through contacts 216 and 217 of key 215, over conductor 219, and through the winding of relay 221 to ground.

As relay 221 becomes energized, it pulls up its armatures to open contact 222, and to close its contacts 223, 224 and 225. Relay 221 becomes locked up over a circuit extending from ground, through the winding of relay 221, then through contact 224 (now closed), over conductor 226, through contact 227 (now closed), over conductor 228, through normally closed key 229 to battery 231. The function of key 229 is to de-energize relay 221 should it be desired to revert from automatic to manual operation. Following the operation of relay 221, the lamp 232 will become illuminated to evidence the condition of the way station apparatus preparatory to sequential collection of information. The circuit for lamp 232 extends from battery 218, through lamp 232, through contact 223 (now closed), to ground. Such is the waiting condition of the system at the way station.

Now, when sequential collection of the system has started and the previously indicated conditioning code signals are transmitted, the selector magnet 208 will control the mechanism in the control unit (as described in said copending application) to select successively bars corresponding to bars 209 and 210 to operate the ratchet assembly (exemplified by arm 211) of the particular way station selected to cause the arm 211 to close the contact 213 thereat. With contact 213 closed and locked by the latch 214, a circuit is established from battery 233, through contact 213, through contact 225 (now closed), over conductor 234, then through the winding of relay 235 to ground. Since the contact 213 is latched closed by the lever 214, a locking circuit for relay 235 is completed from ground, through the winding of relay 235, through contact 236 (now closed), over conductor 237, through contact 213 to battery 233.

The energization of relay 235 also completes an energizing circuit for relay 238 from ground, through the winding of relay 238, through contact 239 (now closed) of relay 235, over conductor 237, through contact 213 to battery 233. Relay 238 upon energizing closes contact 241 and opens contacts 242 and 227. The opening of contact 227 breaks the locking circuit for relay 221. Lamp 232 remains illuminated even when relay 221 is de-energized because of the ground at closed contact 243. Upon the closure of contact 241, a circuit is established for energizing the clutch magnet 244 of the tape transmitter 203 over an obvious circuit. As previously mentioned, the tape containing the weather (or other) information has been inserted in the transmitter 203, so that upon the conditioning of the way station equipment exemplified in Fig. 2, the message will be transmitted from the way station to the master control station (Fig. 1). The receiving printer at the master control station is exemplified by the numeric 35.

At the conclusion of message transmission at the way station (as previously described), an end-of-message signal is transmitted comprising the following code signal combinations: "Figures," "Carriage return," and "Letters." These code signals are perforated in the tape following the regular message, and are impressed on the line 11 to perform a triple function. First, as the signals pass through the selector magnet 208 of the unit 200 at the way station, mechanism is actuated selectively to unlatch lever 214 from the contact 213, thereby permitting the contact 213 to open to restore the way station circuit and apparatus to normal. In this process, the lamp 232 is extinguished and the lamp 245 is illuminated over the circuit extending from battery 231, through lamp 245, through contact 242 (now closed), through contact 222 (now closed), to ground.

Secondly, the end-of-message code signals will select bar 210 in the unit 200, to close a contact 246 to control certain elements embraced in the "deferred break" feature of the present invention, as will hereinafter appear. Thirdly, the end-of-message code signals will affect the circuit at the master control station (Fig. 1) as has been previously described.

According to the "deferred break" feature of the invention, it is also possible for the way station to introduce a "break" in the sequential transmission without interrupting the message then being impressed on the line by the way station introducing the "break" or any other way station. The "deferred break" is initiated by the actuation of the "deferred break" key 251 to complete a circuit for energizing a relay 252 over a circuit extending from battery 253, through the now momentarily closed contacts of key 251, over conductor 254 and through the winding of relay 252 to ground. Relay 252 upon operating closes its contacts 255 and 256. The closing of contact 255 provides a locking circuit for relay 252 from battery 257, through normally closed contact 258 in unit 200, over conductor 259, through contact 255 and through the winding of relay 252 to ground. The contact 258 is controlled selectively by a bar 209 responsive to the "blank" code signal. The closing of contact 256 prepares a circuit for energizing relay 207, through contact 246 (of unit 200) which will be established, as will presently appear.

Thus, the "deferred break" device at the way station is conditioned for operation, and nothing further occurs until the message then being impressed on the signal line 11 by a way station is completed and the end-of-message group of signals, namely, "Figures," "Carriage return," "Letters" codes are transmitted from the way station then transmitting, which may or may not be the way station initiating the "deferred break" by actuating its key 251.

The receipt of the Upper case carriage return signal by the unit 200 not only effects the disengagement of pawl lever 214 to open contact 213 and de-energize relay 238 to open contact 241 to terminate transmission from tape transmitter 203, but also effects the closing of contact 246. The closure of contact 246 establishes the afore-mentioned energizing circuit for relay 207 from battery 261, through contact 256 (now closed) of relay 252, over conductor 262, through contact 246 (now closed momentarily), over conductor 263, and through the winding of relay 207 to ground. Relay 207 is of the slow-to-release type with a release time greater than that of relay 41 (Fig. 1) to prevent the sequential control transmitter 23 from operating while the way station commands the signal line 11.

Relay 207, upon operating, closes its contact 264 and opens its contact 206. The opening of contact 206 "breaks" or opens the signal line circuit 11. The closing of contact 264 completes an energizing circuit for relay 265 from battery 266, through contact 264 (now closed) of relay 207, over conductor 267 to junction 268, over conductor 269 and through the winding of relay 265 to ground. Relay 265 becomes locked up over a circuit extending from battery 271, through "tape-out" contact 272 (normally closed) in the urgent message transmitter 205, then over conductor 273, through contact 274 (now closed) of relay 265 and through the winding of relay 265 to ground. The "tape-out" contact 272 is controlled by a tape-out pin as disclosed in the afore-mentioned Patent No. 2,296,845. Relay 265 also closes its contact 275. The opening of the signal line 11 causes the swinger 291 of line relay 201 to swing to the spacing side and close contact 292 to provide steady battery for relay 279 for holding it energized during the open line condition. After relay 207 has released to restore line 11 to a closed condition through its contact 206 the swinger 291 of line relay 201 will move to the marking side and close contact 293 thus removing battery from relay 279 which after a predetermined release time releases and closes its contact 278 which provides a circuit from battery 277 to complete an energizing circuit for relay 276, through contact 278 (now closed) of relay 279, over conductor 281, through contact 275 (now closed) of relay 265, over conductor 282 to junction 283, then through the winding of relay 276 to ground. Relay 276 closes its contacts 284 and 285. The closure of contact 284 completes a locking circuit for relay 276 which extends from battery 271, through contact 272 (still closed) over conductor 273 through contact 274 (now closed) of relay 265, over conductor 269, then through contact 284 of relay 276, then over conductor 282 to junction 283, then through the winding of relay 276 to ground. Contact 285, upon closing, completes an energizing circuit for start magnet 286 of the urgent or special message transmitter 205 from battery 287, through contact 285 (now closed), over conductor 288 and through the winding of magnet 286 to ground.

As a result of transmitter 205, transmitting impulses over line 11 the spacing impulses cause the swinger 291 of line relay 201 to close contact 292 intermittently which re-energizes relay 279 and opens contact 278. Relay 276 which has become locked up through its contact 284, is not now affected by the opening of contact 278. Since armature 291 vibrates in response to the signal impulses, relay 279 (being of the slow-to-release type) remains energized. The vibration of armature 291 also causes selector magnet 208 to respond to signal impulses through marking contact 293, in well known manner.

As previously mentioned, relay 207 has a slower release time than relay 41 (Fig. 1), thereby giving relay 41 time to release, in response to the line break, and open its contact 44 to break the previously described locking circuit for relay 49, the effect of which is to prevent the sequential control transmitter 23 from calling in the next way station. Thus, the way station is permitted to transmit its urgent message, after which the switch 48 (Fig. 1) is again closed momentarily to initiate operation of sequential control as previously described.

Since the signal line is again closed due to the closure of contact 206, the message contained in the tape inserted in the tape transmitter 205 will be transmitted, and transmission will continue until the end-of-message group of signals (punched in the message tape) has been transmitted and the end of the tape is immediately sensed by the tape-out pin, whereupon the contact 272 will open, thereby opening the locking circuits for relays 265 and 276.

As previously described, the relay 207 held the signal line 11 open long enough to de-energize relay 41. The relay 41 will not become energized again until switch 48 has been operated momentarily to resume selective control of way stations, and by closing contact 295 to complete a circuit from battery 42, through contact 39, over conductor 296, through contact 295 of switch 48, over conductor 43 and through the winding of relay 41 to ground. Since, after termination of transmission of the urgent message (following "deferred break") the condition of the signal line is again marking, the contact 26 will be closed and relay 41 will be locked up from battery 32, over armature or swinger 25, through contact 26, over conductors 33 and 47, through contact 45 (now closed), through the winding of relay 41 to ground. Relay 41, upon operating, again closes its contact 44 to establish a locking circuit for relay 49.

Although a specific embodiment of the invention has been described it is understood that the scope of the invention is not limited thereto but embraces all modifications which come within the purview of the appended claims.

What is claimed is:

1. In a telegraph system, a normally closed signal line, a primary station and a plurality of secondary stations connected to said signal line, means at said primary station for transmitting control signals for controlling transmission of messages from said secondary stations to said primary station sequentially according to a predetermined transmitting program, a message transmitter at said primary station, and means at said primary station for suspending transmission of said control signals to facilitate transmission of an urgent message from said message transmitter, said last mentioned means comprising a sequential control unit, a deferred break key, a plurality of relays connected in cascade, said relays being initiated into operation upon the momentary actuation of said break key and continued into operation in cascade manner under the control of said sequential control unit in response to predetermined code signals indicative of end-of-message received from the secondary station then transmitting, the last relay in said cascade circuit being effective to open said signal line, further relay means effective upon the operation of said last relay to initiate operation of said message transmitter, and contact means in said sequential control unit responsive to a predetermined signal to control the de-energization of said last relay to close the signal line, whereby transmission of the message from said message transmitter is effectuated.

2. In a telegraph system, a normally closed signal line, a primary station and a plurality of secondary stations connected to said signal line, means at said primary station for transmitting control signals for controlling transmission of messages from said secondary stations to said primary station sequentially according to a predetermined transmitting program, an urgent message transmitter at each of said secondary stations, and means at said secondary stations for suspending transmission of said control signals to facilitate transmission of an urgent message from the urgent message transmitter of the interrupting secondary station, said last mentioned means comprising a sequential control unit, a deferred break key, a pair of relays, one of said relays being initiated into operation upon the momentary actuation of said break key, the other of said pair of relays being actuated under the control of said sequential control unit in response to predetermined code signals indicative of end-of-message impressed on said signal line, said other of said pair of relays being effective to open said signal line, further relay means effective upon the operation of said other of said pair of relays to initiate operation of said urgent message transmitter, and contact means in said sequential control unit responsive to a predetermined signal to control the de-energization of said other of said pair of relays to close the signal line, whereby transmission of the message from the urgent message transmitter is effectuated.

CARL A. LEVIN.

REFERENCES CITED

The following references are of record in the file of this patent:

UNITED STATES PATENTS

| Number | Name | Date |
|---|---|---|
| 2,172,920 | Anderson | Sept. 12, 1939 |
| 2,238,142 | Weaver | Apr. 15, 1941 |
| 2,336,373 | Starr | Dec. 7, 1943 |
| 2,345,317 | Bailey | Mar. 28, 1944 |